US011797695B2

(12) United States Patent
Takano

(10) Patent No.: US 11,797,695 B2
(45) Date of Patent: Oct. 24, 2023

(54) PROCESSING CONTROL SYSTEM, TERMINAL DEVICE MANAGEMENT SERVER, AND COMPUTER READABLE MEDIUM

(71) Applicant: FUJIFILM BUSINESS INNOVATION CORP., Tokyo (JP)

(72) Inventor: Kentaro Takano, Ashigarakami-gun (JP)

(73) Assignee: FUJIFILM Business Innovation Corp., Tokyo (JP)

(*) Notice: Subject to any disclaimer, the term of this patent is extended or adjusted under 35 U.S.C. 154(b) by 497 days.

(21) Appl. No.: 16/540,430

(22) Filed: Aug. 14, 2019

(65) Prior Publication Data

US 2020/0302072 A1    Sep. 24, 2020

(30) Foreign Application Priority Data

Mar. 18, 2019    (JP) .................... 2019-049862

(51) Int. Cl.
*G06F 21/62* (2013.01)
*G06F 8/65* (2018.01)
*H04L 67/06* (2022.01)

(52) U.S. Cl.
CPC ............ *G06F 21/6209* (2013.01); *G06F 8/65* (2013.01); *G06F 21/6218* (2013.01); *H04L 67/06* (2013.01)

(58) Field of Classification Search
CPC .. G06F 21/554; G06F 21/577; G06F 21/6218; G06F 21/57; G06F 21/604; G06F 2201/865; G06F 21/608; G06F 21/606; G06F 2221/2141; H04L 63/105; H04L 63/10

See application file for complete search history.

(56) References Cited

U.S. PATENT DOCUMENTS

| 7,783,765 B2 | 8/2010 | Hildebrand et al. |
| 2012/0151553 A1 | 6/2012 | Burgess et al. |
| 2013/0312059 A1* | 11/2013 | Otsuki ................... H04H 60/16 726/1 |

(Continued)

FOREIGN PATENT DOCUMENTS

| JP | 2007-316686 A | 12/2007 |
| JP | 2008-217604 A | 9/2008 |

(Continued)

OTHER PUBLICATIONS

May 18, 2020 Office Action issued in Australian Patent Application No. 2019226141.

(Continued)

*Primary Examiner* — Tae K Kim
(74) *Attorney, Agent, or Firm* — Oliff PLC

(57) ABSTRACT

A processing control system includes: at least one terminal device that is used by at least one user; a monitoring unit that monitors a security status of the at least one terminal device; and a control unit that controls, in a case where the security status which relates to executing processing instructed from the at least one user does not meet a condition, the processing including plural sub-processing operations on the at least one terminal device, execution of each of the sub-processing operations on the at least one terminal device based on the security status of the at least one terminal device.

10 Claims, 9 Drawing Sheets

(56) References Cited

U.S. PATENT DOCUMENTS

| | | | |
|---|---|---|---|
| 2014/0032691 A1* | 1/2014 | Barton | H04L 41/00 709/206 |
| 2015/0358356 A1* | 12/2015 | Diaz-Tellez | G06F 21/6218 726/1 |
| 2016/0119309 A1 | 4/2016 | Sawicki et al. | |
| 2016/0283406 A1* | 9/2016 | Linga | G06F 21/60 |
| 2016/0285835 A1* | 9/2016 | Linga | G06F 21/62 |
| 2018/0096158 A1* | 4/2018 | Murphy | G06F 21/10 |
| 2018/0268155 A1* | 9/2018 | Kamiya | G06F 21/41 |
| 2018/0275928 A1* | 9/2018 | Sekine | G06F 3/1225 |
| 2019/0289039 A1* | 9/2019 | Kamiya | H04L 63/0823 |

FOREIGN PATENT DOCUMENTS

| | | | |
|---|---|---|---|
| JP | 2010-271916 A | 12/2010 | |
| JP | 2018-013875 A | 1/2018 | |

OTHER PUBLICATIONS

Nov. 15, 2022 Office Action issued in Japanese Patent Application No. 2019-049862.

\* cited by examiner

FIG. 4

| TRANSMITTING SIDE TERMINAL | | |
|---|---|---|
| TCP/IP COMMUNICATION SOFTWARE UPDATE | SHORT RANGE COMMUNICATION SOFTWARE UPDATE | STATE |
| COMPLETED | COMPLETED | S1 |
| COMPLETED | NON-COMPLETED | S2 |
| NON-COMPLETED | COMPLETED | S3 |
| NON-COMPLETED | NON-COMPLETED | S4 |
| RECEIVING SIDE TERMINAL | | |
| COMPLETED | COMPLETED | S5 |
| COMPLETED | NON-COMPLETED | S6 |
| NON-COMPLETED | COMPLETED | S7 |
| NON-COMPLETED | NON-COMPLETED | S8 |

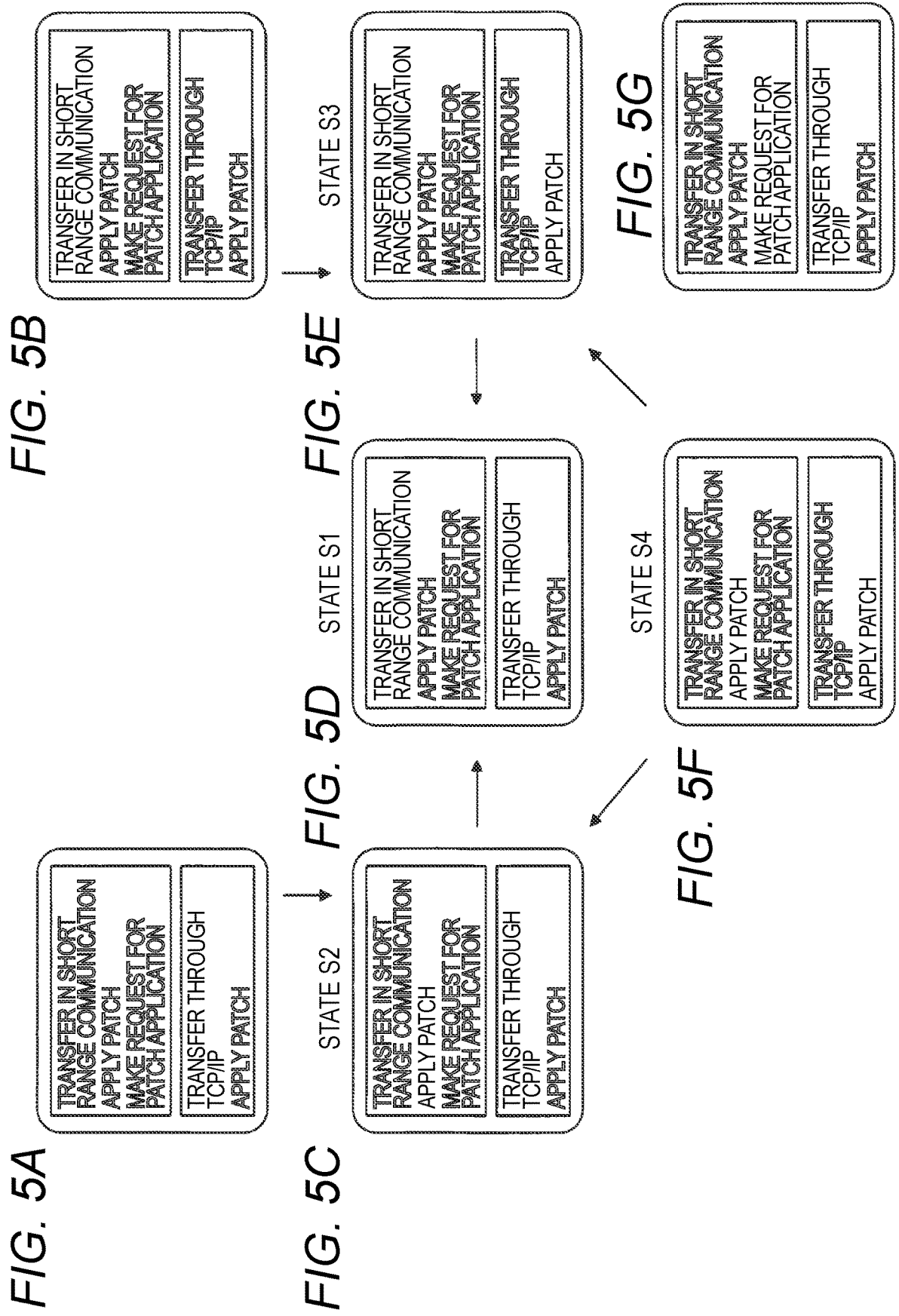

*FIG. 6A*

MR./MS. A HAS REQUESTED TO APPLY PATCH FOR SHORT RANGE COMMUNICATION SOFTWARE. DO YOU WANT TO APPLY PATCH?

[ DO ]  [ DO NOT ]

*FIG. 6B*

DOCUMENT FROM MR./MS. A HAS ARRIVED. YOU CAN GET IT BY APPLYING PATCH TO TCI/IP SOFTWARE. DO YOU WANT TO APPLY PATCH?

[ DO ]  [ DO NOT ]

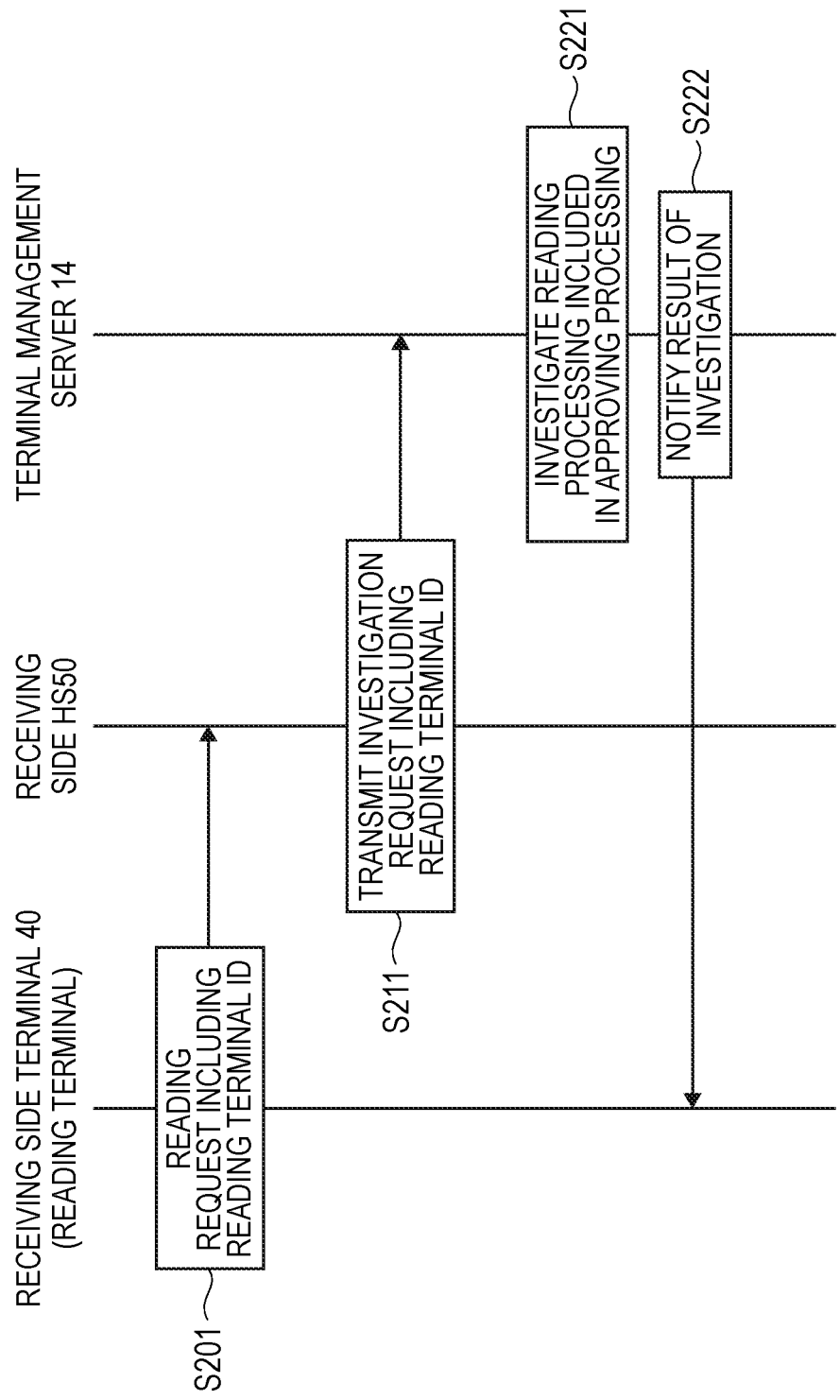

FIG. 8
| READING TERMINAL | | |
|---|---|---|
| TERMINAL TYPENON-MDM | READING SOFTWARE UPDATE | STATE |
| MDM | COMPLETED | S9 |
| MDM | NON-COMPLETED | S10 |
| NON-MDM | COMPLETED | S11 |
| NON-MDM | NON-COMPLETED | S12 |
FIG. 9A
STATE S10
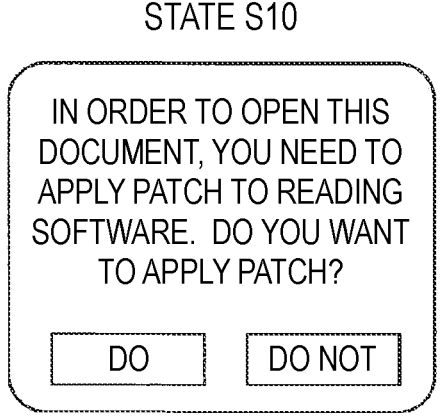
FIG. 9B
STATE S11, STATE S12
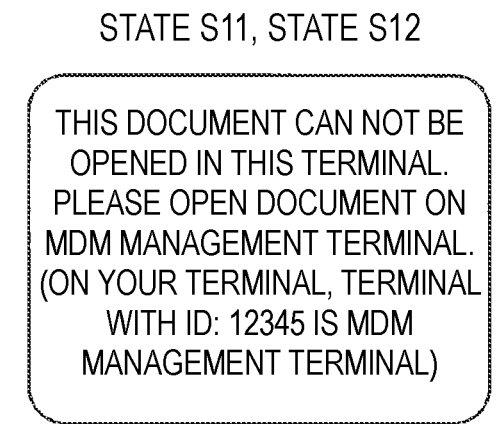

PROCESSING CONTROL SYSTEM, TERMINAL DEVICE MANAGEMENT SERVER, AND COMPUTER READABLE MEDIUM

CROSS REFERENCE

This application is based on and claims priority under 35 USC 119 from Japanese Patent Application No. 2019-049862 filed on Mar. 18, 2019.

BACKGROUND

Technical Field

An exemplary embodiment of the invention relates to a processing control system, a terminal device management server, and computer readable medium storing a program.

Related Art

When processing is performed on a computer, in some cases, the processing is interrupted from the perspective of safety on detecting a potential security problem. For example, it is proposed that an access to a terminal device whose security level is determined as not being at a preset level or higher is denied. (For example, please see JP-A-2007-316686, JP-A-2008-217604, and JP-A-2018-013875.)

SUMMARY

In some cases, processing performed on the terminal device includes a combination of multiple sub-processing operations. In the related art, when there is a potential security problem in any one of the sub-processing operations, the processing is determined as not to be performed.

Aspect of non-limiting embodiments of the present disclosure relates to, in a case where there is a potential security problem in performing the processing on a terminal device, perform the processing within a range where the problem does not occur.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a processing control system including: at least one terminal device that is used by at least one user; a monitoring unit that monitors a security status of the at least one terminal device; and a control unit that controls, in a case where the security status which relates to executing processing instructed from the at least one user does not meet a condition, the processing including plural sub-processing operations on the at least one terminal device, execution of each of the sub-processing operations on the at least one terminal device based on the security status of the at least one terminal device.

BRIEF DESCRIPTION OF DRAWINGS

Exemplary embodiment(s) of the present invention will be described in detail based on the following figures, wherein:

FIG. 4 is a diagram illustrating in a table format a combination pattern of a result of investigation that is presented by a terminal management server when the transferring processing is performed according to the exemplary embodiment;

FIGS. 5A to 5G are diagrams each illustrating an example of screen display that is a candidate for display on a transmitting side terminal when the transferring processing is performed according to the exemplary embodiment;

FIGS. 6A and 6B are diagrams each illustrating an example of the screen display that is the candidate for display on a receiving side terminal when the transferring processing is performed according to the exemplary embodiment;

FIG. 7 is a sequence diagram illustrating processing that is performed when reading processing is performed according to the exemplary embodiment;

FIG. 8 is a diagram illustrating in a table format a combination pattern of a result of investigation that is presented by the terminal management server when the reading processing is performed according to the exemplary embodiment;

FIGS. 9A and 9B are diagrams each illustrating an example of screen display that is a candidate for display on the receiving side terminal when the reading processing is performed according to the exemplary embodiment.

DETAILED DESCRIPTION

An exemplary embodiment of the invention will be described below with reference to the drawings.

Figure 1:
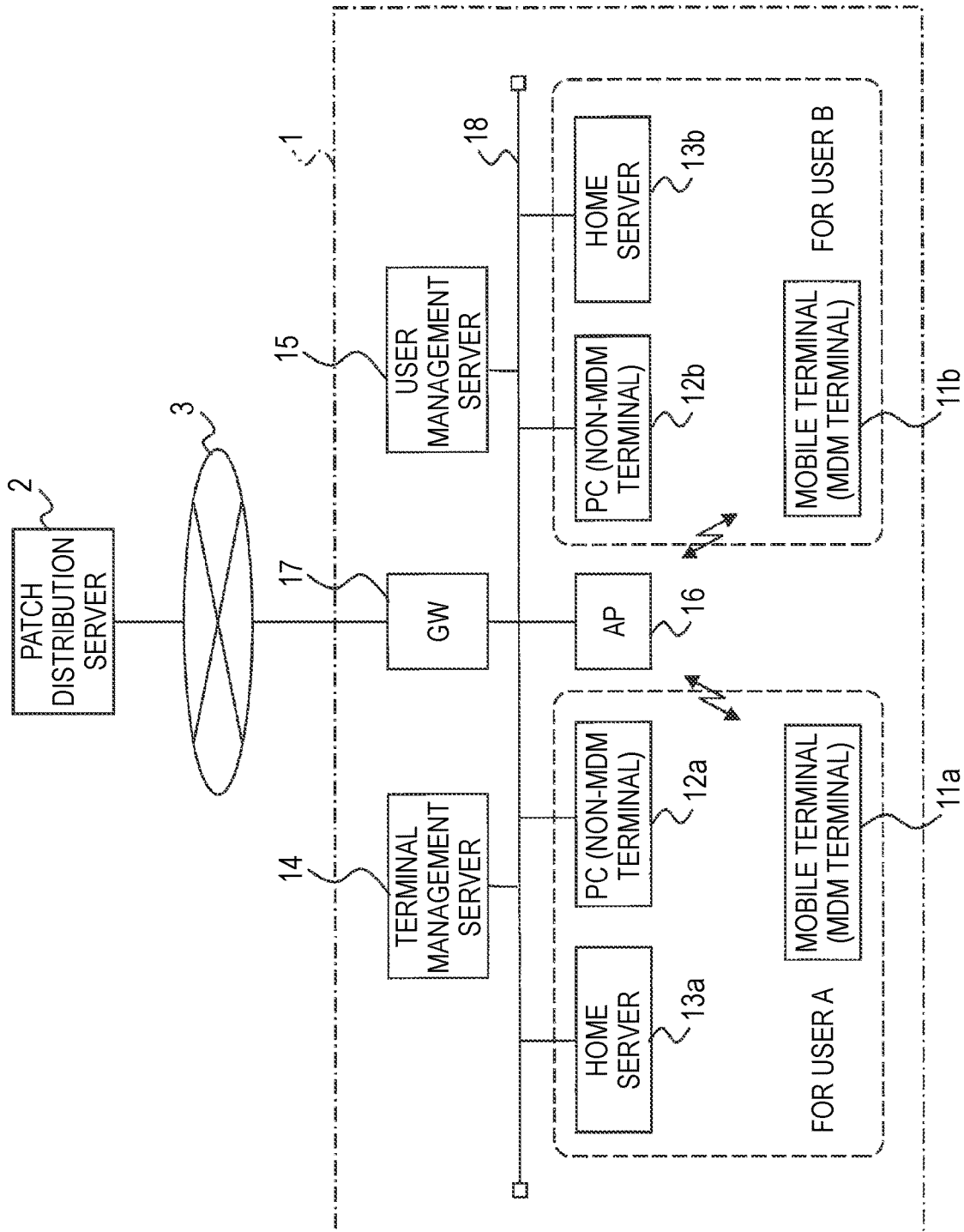
FIG. 1 is a diagram of an entire configuration of a network system according to an exemplary embodiment.

FIG. 1 is a diagram of an entire configuration of a network system according to the exemplary embodiment. In FIG. 1, a configuration is illustrated in which a local system 1 and a patch distribution server 2 that are installed in a certain office are connected through the Internet 3.

The local system 1 is a system that is used by multiple users. In the exemplary embodiment, computers that are caused to represent a user A and a user B and are used by the user A and the user B, respectively. That is, the local system 1 has a mobile terminal 11a, a personal computer (PC) 12a, and a home server 13a, which are used by the user A, and has a mobile terminal 11b, a PC 12b, and a home server 13b, which are used by the user B. It is noted that the mobile terminals 11a and 11b are collectively referred to "mobile terminal 11" in a case where there is no need to distinguish between the mobile terminals 11a and 11b. In the same manner, the PCs 12a and 12b and the home servers 13a and 13b are collectively referred to "PC 12" and "home server 13", respectively, in a case where there is no need to distinguish between the PCs 12a and 12b and between the home servers 13a and 13B.

The local system 1 further has a terminal management server 14, a user management server 15, an access point (AP) 16, and a gateway (GW) 17, and is configured to be connected to a Local Area Network (LAN) 18, which are described above, as well as the PC 12 and the home server 13. Various pieces of software are installed on terminal devices that are used by the users A and B, respectively, that is, the mobile terminal 11 and the PC 12. In the case of the exemplary embodiment, a communication software for transferring a document and software for reading the document are installed.

In order to perform data communication through the Internet 3, the LAN 18 or the access point 16, Transmission Control Protocol/Internet Protocol (TCP/IP) communication software as communication software (hereinafter, referred to "TCP/IP communication software) is installed in the mobile terminal 11 and the PC 12. Moreover, in order to perform short range communication, short range communication software as communication software (hereinafter referred to a "short range communication software") is installed in the mobile terminal 11. The "short range communication" is synonymous with short distance wireless communication, and, in the case of the exemplary embodiment, is assumed to be wireless communication that complies with a Bluetooth (a registered trademark) communication standard, but no need to be limited to such a communication standard.

The mobile terminal 11 according to the exemplary embodiment is a smartphone, a tablet terminal, or the like that is a target for management, such as Mobile Device Management (MDM), within the office, and that is managed in an integrated manner in a management department or the like of the office. The security in accordance with a policy of the office is set for the mobile terminal 11, types or versions of pieces of software that are installed on the mobile terminal 11, or functions that may be performed on the mobile terminal 11 are managed, and a setting is performed on the mobile terminal 11 in such a manner that software or data cannot be willfully introduced into it for private use. In the following description, in some cases, the mobile terminal 11 is referred to as "MDM terminal".

On the other hand, the PC 12 is a terminal device that is connected in a wired manner to the LAN 18, and is not the target for the management such as the MDM. Therefore, in the following description, in some cases, a terminal device other than the MDM terminal 11, such as the PC 12, is referred to as "non-MDM terminal".

The home server 13 performs supporting that is necessary when the users perform processing using their respective terminal devices 11 and 12, managing of a document, data, and the like that is handled, and so on.

The terminal management server 14 manages the terminal devices 11 and 12 that are used within the local system 1. The user management server 15 manages pieces of information or documents relating to the users who use the terminal devices 11 and 12 within the local system 1. The access point 16 is connected to the local system 1 by performing wireless communication between the mobile terminals 11. It is noted that in FIG. 1, it is illustrated that one access point 16 is connected to the LAN 18 and that both the mobile terminal 11a and the mobile terminal 11b are wirelessly connected to the access point 16, but that a configuration may be employed in such a manner as to provide multiple access points 16 and to wirelessly connect the mobile terminal 11a and the mobile terminal 11b to different access points 16. The gateway 17 connects the local system 1 to the Internet 3.

The patch distribution server 2 provides a patch for software to a user who uses the software. The "patch" is data for performing a bug correction or a functional change by updating a portion of software (particularly, a program) on a computer. The patch is also referred to as "update (program)" or the like. Making an actual change to software is expressed as "apply a patch", "add a patch", "perform an update" or the like. The patch may be provided from a server that varies with a seller of or a type of software to the user, but in the exemplary embodiment, is assumed to be provided from one patch distribution server 2 for convenience.

Each of the devices 2 and 11 to 17 that are illustrated in FIG. 1 is formed by a computer, or, because it has a built-in computer, includes a CPU, a ROM, a RAM, a storage unit, such as a hard disk drive (HDD), and a network interface as a communication unit. Furthermore, at least the terminal devices 11 and 12 includes a user interface through which the user inputs information or information is provided to the user. Moreover, in the case of the mobile terminal 11, a short range communication interface for performing short range communication with any other mobile terminal 11 is mounted.

Figure 2:
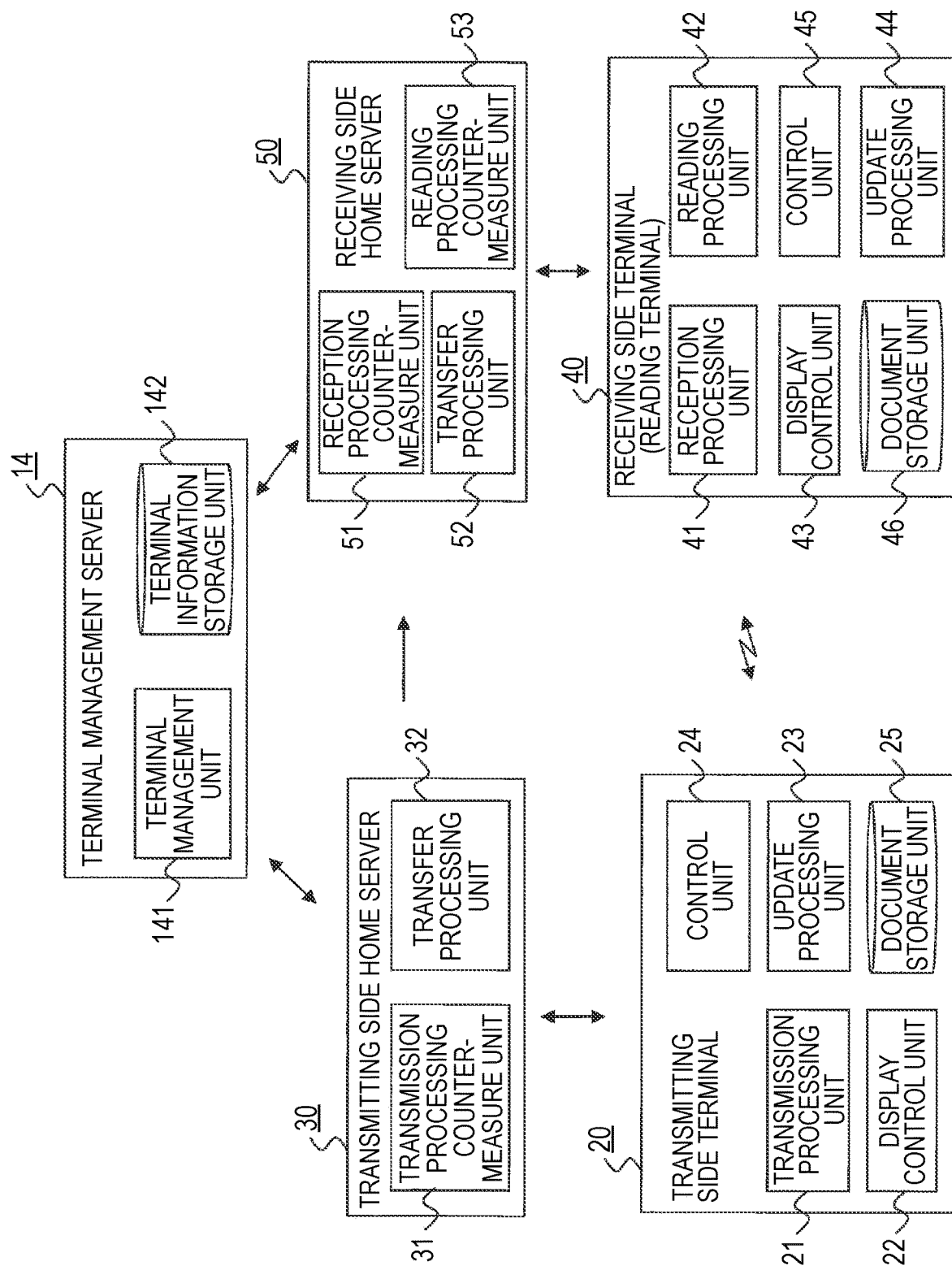
FIG. 2 is a block configuration diagram illustrating essential parts of a local system according to the exemplary embodiment.

FIG. 2 is a block configuration diagram illustrating essential parts of the local system 1 according to the exemplary embodiment. The local system 1 according to the exemplary embodiment includes a transmitting side terminal 20, a transmitting side home server 30, a receiving side terminal 40, a receiving side home server 50, and the terminal management server 14 described above.

Incidentally, in the exemplary embodiment, in order that a user (for example, the user A) who is present within the local system 1 obtains an approval of a document by any other user (for example, the user B), a user scene is assumed in which a document is transferred from the terminal device which is used by the user A to the terminal device which is used by the user B and in which the user B displays the transferred document for reading. In other words, the local system 1 is a processing control system that performs this processing, and performs control that carries out approving processing for performing the approval described above. The approving processing includes multiple sub-processing operations, such as transferring processing for transferring a document and reading processing for reading a document.

It is noted that the user A or the user B may transfer a document. Therefore, if the user A transfers a document, the transmitting side terminal 20 is the mobile terminal 11a or the PC 12a, and the receiving side terminal 40 is the mobile terminal 11b or the PC 12b. Then, the transmitting side home server 30 is the home server 13a, and the receiving side home server 50 is the home server 13b. If the user B transfers a document, the reverse of the order described above is set. In this manner, because both the user A and the user B may be on the transferring side, in FIG. 2, for configuration, home servers and terminals other than the terminal management server 14 are illustrated having different names from those in FIG. 1. In the exemplary embodiment, for the convenience of description, for illustration, constituent elements are divided into those on the transmitting side and those on the receiving side. However, each of the terminal devices 11 and 12 may be both on the transmitting side and the receiving side, and because of this, basically has configuration of both the transmitting side terminal 20 and the receiving side terminal 40.

The transmitting side terminal 20 has a transmission processing unit 21, a display control unit 22, an update processing unit 23, a control unit 24, and a document storage unit 25. It is noted that constituent elements that are not used for description of the exemplary embodiment are omitted from the figure. The same is also true for any other constituent elements 30, 40, 50, and 14.

The transmission processing unit 21 performs transmission processing for transmitting a document. The display control unit 22 performs display control of an inquiry screen that inquires about patch application, as will be described below. In a case where the user makes a request for repair of a security problem by selecting the patch application from the inquiry screen, the update processing unit 23 performs the repair of the problem. Specifically, a patch for software that is a target for the patch application is acquired from the patch distribution server 2 according to a selection operation for the patch application by the user. The control unit 24 performs control that carries out processing for transferring a document, in cooperation with any other constituent elements 21 to 23. A document that is a target for transfer is stored in the document storage unit 25.

The transmitting side home server 30 has a transmission processing countermeasure unit 31 and a transfer processing unit 32. When transmission processing is performed in the transmitting side terminal 20, the transmission processing countermeasure unit 31 takes a countermeasure, such as transmitting of information to the receiving side home server 50 and the terminal management server 14, according to a request for transmission from the transmitting side terminal 20. The transfer processing unit 32 transfers a document that is transmitted from the transmitting side terminal 20, to the receiving side home server 50.

The receiving side terminal 40 has a reception processing unit 41, a reading processing unit 42, a display control unit 43, an update processing unit 44, a control unit 45, and a document storage unit 46. The reception processing unit 41 receives a document that is transmitted by the transmitting side terminal 20, and stores the received document in the document storage unit 46. The reading processing unit 42 performs the reading processing for reading the document that is stored in the document storage unit 46. In the same manner as the update processing unit 23, the update processing unit 44 performs antenna processing of the software that is the target for the patch application, according to the selection operation for the patch application by the user. The control unit 45 performs control that carries out the processing for transferring a document and the processing for reading a document, in cooperation with any other constituent elements 41 to 44. A document that is a target for reading is stored in the document storage unit 46.

The receiving side home server 50 has a reception processing countermeasure unit 51, a transfer processing unit 52, and a reading processing countermeasure unit 53. When processing for receiving a document is performed in the receiving side terminal 40, the reception processing countermeasure unit 51 takes a countermeasure, such as responding to a prior approval notification from the transmitting side home server 30. The transfer processing unit 52 transfers a document that is transmitted from the transmitting side home server 30, to the receiving side terminal 40.

Then, the terminal management server 14 described above has a terminal management unit 141 and a terminal information storage unit 142. The terminal management unit 141 monitors each of the terminal devices 11 and 12 that are used in the local system 1, and manages a state of each of the terminal devices 11 and 12. Furthermore, a situation of the patch application or the like in each of the terminals 20 and 40 is investigated according to a request from each of the home servers 30 and 50. The "state", for example, is a setting situation or state of hardware and software, and the setting situation or the like is set to be stored in terminal information that is stored in the terminal information storage unit 142. Furthermore, a manager creates a vulnerability information database (not illustrated) that is based on a database which is already open to the public, updates the vulnerability information database suitably, and determines the vulnerability of each of the terminal devices 11 and 12 by comparing the updated vulnerability information database against the terminal information.

Stored in the terminal information storage unit 142 is the terminal information relating to each of the terminal devices 11 and 12 that are used in the local system 1. Hardware information and software information are included in the terminal information in a manner that corresponds to identification information on the terminal device (hereinafter referred to as "terminal ID"), and each piece of information is registered when started to be used in the local system 1 and is suitably updated each time a configuration is changed after the registration. The hardware information includes a frame name, a manufacturer, a serial number, the date of manufacture, pieces of replacement information on a mother board and hardware, and so on. The software information includes an OS version, software installed, a version of the software installed, the situation of the patch application, and so on. Moreover, the software information includes a type of terminal indicating whether each of the terminal devices 11 and 12 is the MDM terminal or the non-MDM terminal. In the exemplary embodiment, particularly, a situation of application of a patch to a TCP/IP communication software and short range communication software is referred to.

The constituent elements 141 to 142, 21 to 24, 51 and 52, and 41 to 45 in the servers 14, 30, and 50, and the terminals 20 and 40 that are illustrated in FIG. 2 are realized by a cooperative operation between a computer that forms the servers 14, 30, and 50, and the terminals 20 and 40, and a program that runs on the CPU mounted in the computer. Furthermore, the terminal information storage unit 142 is realized by a storage unit such as an HDD that is mounted in the terminal management server 14. Alternatively, a RAM or a storage unit that is externally present may be used through a network.

Furthermore, of course, a program that used in the exemplary embodiment is provided by a communication unit, and is also possibly provided in a manner that is stored on a computer-readable recording medium such as a CD-ROM or a USB memory. The program that is provided using the communication unit and the recording medium is installed on the computer, and various types of processing are realized by a CPU of a computer sequentially executing the program.

Figure 3:
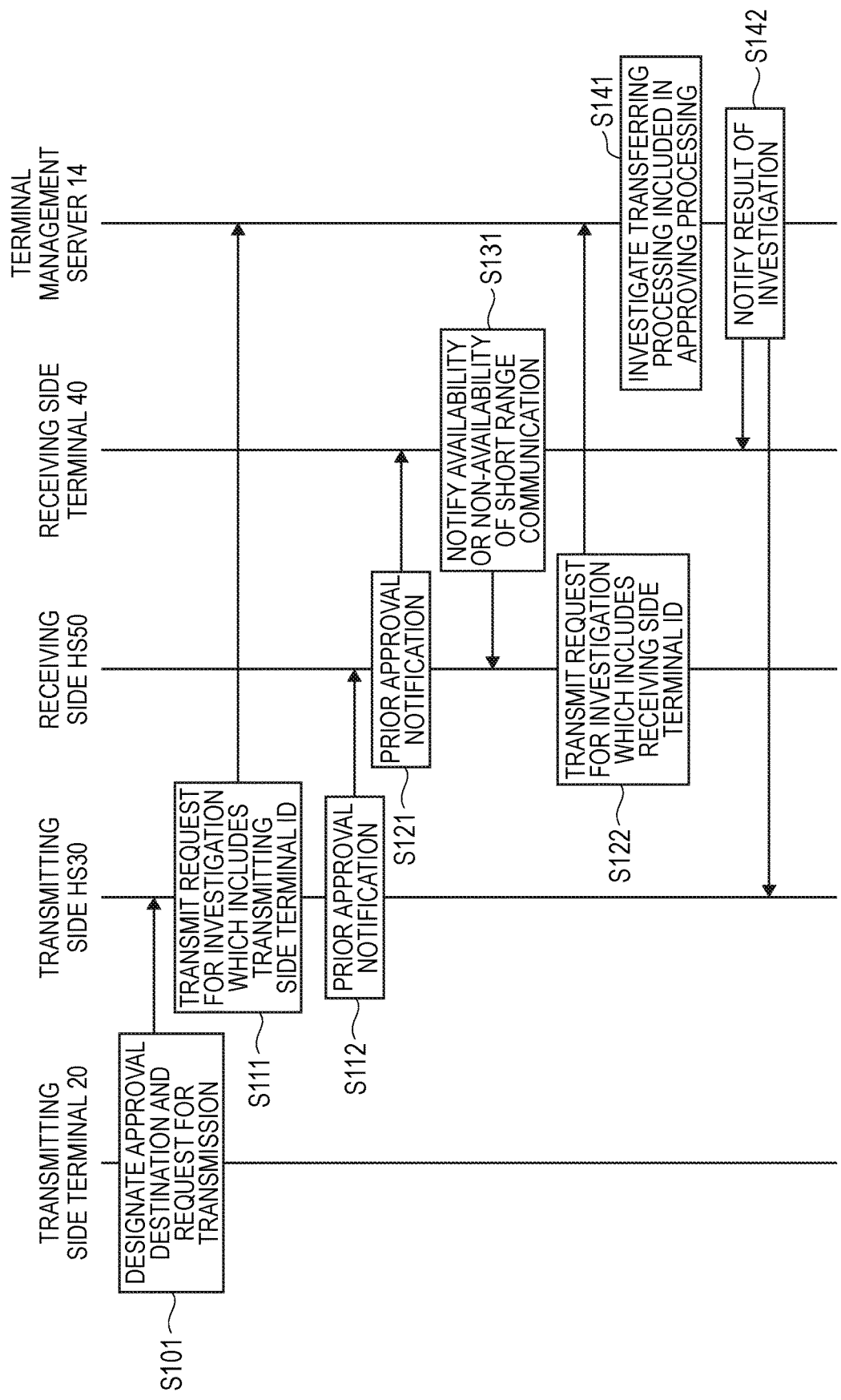
FIG. 3 is a sequence diagram illustrating processing that is performed before transferring processing according to the exemplary embodiment is performed.

Next, operation of a network system according to the exemplary embodiment will be described. As described above, in the exemplary embodiment, as an example, a case is described where the approving processing including multiple sub-processing operations, such as the transferring processing for transferring a document within the local system 1 and the reading processing for reading the transferred document is performed. A document is transferred from the transmitting side terminal 20 to the receiving side terminal 40, but processing that is to be performed before this transferring processing is performed initially is described with reference to a sequence diagram that is illustrated in FIG. 3. It is noted that a user who sends a document and a user who receives a document are defined here as the user A and the user B, respectively.

First, the user A who desires to transfer a document in order to obtain an approval designates a document that is a target for transfer and an approval destination and perform an operation for an instruction to transmit the document. The transmitting side terminal 20 that is used by the user A for a request for transmission of a document may be the mobile terminal 11*a* or the PC 12*a*, but, unless particularly specified otherwise, the request for the transmission is described here as being made from the mobile terminal 11*a*. The transmission processing unit 21 in the transmitting side terminal 20 transmits the request for the transmission including the document and the approval destination (in this case, the user B) to the transmitting side home server (HS) 30, according to a user operation (Step 101). The user A may set the user B as the approval destination (that is, the terminal device that is a reception destination of a document may be the mobile terminal 11*b* of, or the PC 12*b* of, the user B), and the user B may specifically designate the mobile terminal 11*b* or the PC 12*b* that is used by the user B. Unless particularly specified otherwise, the mobile terminal 11*b* is described here as being designated.

When the transmitting side home server 30 receives the request for the transmission, the transmission processing countermeasure unit 31 transmits a request for investigation in the approving processing, which includes a terminal ID of the transmitting side terminal 20 and the approval destination, to the terminal management server 14 (Step 111). The terminal management server 14 receives the request for the investigation, which is transmitted from the transmitting side home server 30.

The transmission processing countermeasure unit 31 further transmits the prior approval notification including the terminal ID of the transmitting-side terminal 20 and the approval destination, to the receiving side home server (HS) 50 (Step 112). It is noted that although multiple receiving side home servers 50 are present, the transmission processing countermeasure unit 31 may specify the receiving side home server 50 that is set to be a transmission destination, from the approval destination that is included in the request for the transmission.

When the receiving side home server 50 receives the prior approval notification, the reception processing countermeasure unit 51 transfers the received prior approval notification to the receiving side terminal 40 (Step 121). In a case where the user B is designated simply as the approval destination, if the terminal device that may be specified from the terminal ID of the transmitting side terminal 20 is the mobile terminal 11*a*, the reception processing countermeasure unit 51 selects the mobile terminal 11*b* that has a short range communication function, as the approval destination. If the transmitting side terminal 20 is the PC 12*a*, arbitrary terminal devices 11*b* and 12*b* may be selected. As described above, the approval destination is described here as being the mobile terminal 11*b*.

When the receiving side terminal 40 (here, the mobile terminal 11*b*) receives the prior approval notification from the reception processing countermeasure unit 51, the reception processing unit 41 checks whether or not a state is entered where short range communication with the transmitting side terminal 20 (here, the mobile terminal 11*a*) with the terminal ID that is included in prior approval notification is available, and notifies a result of the checking, that is, the availability or non-availability of the short range communication (Step 131).

When from the prior approval notification received from the receiving side terminal 40, it is checked that the short range communication is available, the reception processing countermeasure unit 51 in the receiving side home server 50 transmits the request for the checking in the approval processing, which includes the terminal ID of the receiving side terminal 40, to the terminal management server 14 (Step 122). The terminal management server 14 receives the request for the investigation, which is transmitted from the receiving side home server 50.

It is noted that, in a case where it is notified that the receiving side terminal 40 (here, the mobile terminal 11*b*) is in a state of not being able to perform the short range communication with the transmitting side terminal 20 (here, the mobile terminal 11*a*), if the transmitting side terminal 20 does not designate the mobile terminal 11*b* as the approval destination, it is also possible that the approval destination is changed to the PC 12*b*.

When the request for the investigation is received from both the transmitting side home server 30 and the receiving side home server 50, the terminal management unit 141 in the terminal management server 14 investigates a state associated with the transferring processing referring to the terminal information. It is noted that it is possible that the terminal ID or the like in the request for the investigation from both the transmitting side home server 30 and the receiving side home server 50 is referred to for linking.

Regarding contents of the investigation, a communication state of each of the transmitting side terminal 20 and the receiving side terminal 40, specifically, the availability or non-availability of the short range communication and TCP/IP communication and the situation of the application of the patch to the short range communication software and the TCP/IP communication software are investigated (Step 141). Then, a result of the investigation is transmitted to both the transmitting side terminal 20 and the receiving side terminal 40 (Step 142).

It is noted that in the exemplary embodiment, the home server 30 and 50 are set to transmit a request to the terminal management server 14, but each of the terminal 20 and 40 may be set to transmit a request directly to the terminal management server 14 without using the home servers 30 and 50. The same is true for the reading processing that will be described below.

A result of the investigation for the transferring processing by the terminal management server 14 is described here with reference to a table that is illustrated in FIG. 4. It is noted that unless particularly specified otherwise, the transmitting side terminal 20 is the mobile terminal 11*a* and the receiving side terminal 40 is the mobile terminal 11*b*.

In the exemplary embodiment, multiple communication paths, such as a path for the TCP/IP communication, as a path that is used for the transferring processing, and a path for the short range communication, are present between the mobile terminal 11*a* and the mobile terminal 11*b*. Therefore, in the terminal management server 14, referring to the terminal information on each of the terminal 20 and 40, it is investigated whether or not the TCP/IP communication software and the short range communication software is completely updated for each of the transmitting side terminal 20 and the receiving side terminal 40. At this point, the completed update ("completed" in FIG. 4) indicates that a version of the software is the latest, and means that, in the case of the latest version, the safety is ensured in terms of security at a current stage. On the other hand, the non-completed update ("non-completed" in FIG. 4) indicates that the version of the software is not the latest, and means that because the version is not the latest, there is a potential security problem, that is a likelihood that the security problem will occur.

It is noted that the safety is determined with a relationship between the situation of the application of the patch to the communication software, which is set to be in the terminal information and the vulnerability of the communication software, information on which is collected in a vulnerability database, and thus that in some cases, although the version is not the latest, the safety is guaranteed in terms of security. On the other hand, although the version is the latest, there is a likelihood that the safety will not be reliably guaranteed in terms of security. However, in the exemplary embodiment, for the convenience of description, as described above, if the version is the latest, it is assumed that the safety is guaranteed in terms of security, and that there is no security problem. On the other hand, if the version is not the latest, it is assumed that the safety is not guaranteed in terms of security, and that there is a security problem. Then, although the version is not the latest, if an update to the latest version occurs, it is assumed that the security problem is resolved, that is, that the security problem is removed.

In FIG. 4, update state combinations of the TCP/IP communication software and the short range communication software are illustrated as states S1 to S8.

Subsequently, processing that is performed in each of the terminals 20 and 40 after the terminal management server 14 replies with a result of the investigation is described with reference to FIGS. 5 and 6. First, processing on the transmitting side terminal 20 side is described with reference to FIGS. 5A to 5G.

FIGS. 5A to 5G are diagrams each illustrating an example of screen display that is a display candidate when the transmission processing is performed in the transmitting side terminal 20. The display control unit 22 displays any screen under the control of the control unit 24 and causes the screen to transition, as necessary, according to the selection operation by the user. It is noted that in FIGS. 5A to 5G, a string of characters in the screen represents one item per one row and is equivalent to an operation button. It is hereinafter assumed that each row is referred to as "item". As illustrated in FIGS. 5A to 5G, each item is displayed in two types. One item is displayed in black and is selectable by the user at a current state. The other item is displayed in gray, that is, in a grayed-out state, and cannot be selected by the user at the current state. Here, in FIGS. 5A to 5G, an outlined state is substituted for the grayed-out state.

First, in the state S1 that is illustrated in FIG. 4, that is, in a case where the latest update of both the TCP/IP communication software and the short range communication software are completed and where a latest version state is entered, the display control unit 22 displays a screen that is illustrated in FIG. 5D. More precisely, in a case where the safeties of both the communication path for the TCP/IP and the path for the short range communication are guaranteed and where the security problem does not occur, when transmitting a document in the transmitting side terminal 20, the control unit 24 displays an item, which corresponds to the communication path (here, both the communication paths), in black, in such a manner that an operation instruction may be received from the user. Therefore, the user may select any communication path and may transmit a document.

In a case where the user selects the item "transfer in short range communication", the transmission processing unit 21 takes a document, which is a target for transfer, out of the document storage unit 25, and transmits the document directly to the receiving side terminal 40, using the short range communication. On the other hand, in a case where the user selects the item "transfer through TCP/IP", the transmission processing unit 21 takes a document, which is a target for transfer, from the document storage unit 25, and transmits the document to the transmitting side home server 30, using the TCP/IP communication. The transfer processing unit 32 in the transmitting side home server 30 transmits the received document to the receiving side home server 50 through a LAN 18. Although the receiving side terminal 40 is not in a state where the TCP/IP communication is available, or although the version of the TCP/IP communication software is not the latest, the processing so far is performed. The transfer processing unit 52 in the receiving side home server 50 receives the document that is transmitted from the transmitting side home server 30. Then, in a case where the receiving side terminal 40 is in the state where the TCP/IP communication is available and where the TCP/IP communication software is the latest, the transfer processing unit 52 transmits the document to the receiving side terminal 40, using the TCP/IP communication. It is noted that, in the case of the TCP/IP communication, the transmitting side terminal 20 is described here as being retaining the document that is the target for transfer, but in a case where the document that is the target for transfer is retained by the transmitting side home server 30 or the user management server 15, a transfer instruction may be sent to the server 30 or 15 that retains the document, and the server 30 or 15 may be caused to transmit the document.

In the state S2 that is illustrated in FIG. 4, that is, in a case where the version of the TCP/IP communication software is the latest and where, on the other hand, because the short range communication software is not completely updated, the short range communication software is not in its latest-version state, the display control unit 22 displays a screen that is illustrated in FIG. 5C. More precisely, the safety of the communication path for the TCP/IP is guaranteed and the security problem does not occur. Because of this, displaying in black is performed in the same manner as in the state S1. On the other hand, because the version of the short range communication software is not the latest, there is a likelihood that the security problem will occur on the path for the short range communication. Because of this, the control unit 24 displays the item "transfer in short range communication" in a grayed-out state in such a manner that the operation instruction cannot be received from the user, and causes the selection operation by the user not to be applied.

The user may select the path for the TCP/IP communication, more precisely, select the item "transfer through TCP/IP", and may transfer a document. On the other hand, in a case where the user desires to use the path for the short range communication, he/she selects the item "apply a path". According to the selection of this item, the control unit 24 activates the update processing unit 23. The update processing unit 23 acquires a patch for providing an upgrade to the latest version of the short range communication software, from the patch distribution server 2, according to an instruction from the control unit 24, and makes the version of the short range communication the latest one by adding the patch to the short range communication software. When it is checked that the version is the latest, for display, the display control unit 22 switches to a screen that is illustrated in FIG. 5D. Then, the user may transmit a document along the path for the short range communication by selecting the item "transfer in short range communication".

It is noted that FIG. 5C illustrates a case where the transmitting side terminal 20 and the receiving side terminal 40 are at a position at which the short range communication is available. In the case of the absence at the position at which the short range communication is available, the display control unit 22 displays a screen that is illustrated in FIG. 5A. In this case, the user may move up to a position at which the short range communication with the receiving side terminal 40 is available, and so on, and thus may cause a screen that is illustrated in FIG. 5C, to be displayed.

In the state S3 that is illustrated in FIG. 4, that is, in a case where the version of the short range communication software is the latest and where, on the other hand, because the TCP/IP communication software is not completely updated, the TCP/IP communication software is not in its latest version state, the display control unit 22 displays a screen that is illustrated in FIG. 5E. More precisely, the safety of the communication path for the short range communication is guaranteed, and the security problem does not occur. Because of this, displaying in black is performed in the same manner as in the state S1. On the other hand, because the version of the TCP/IP communication software is not the latest, there is a likelihood that the security problem will occur on the path for the TCP/IP communication. Because of this, the control unit 24 displays the item "transfer through TCP/IP" in a grayed-out state in such a manner that the operation instruction cannot be received from the user, and causes the selection operation by the user not to be applied.

The user may select the path for the short range communication, more precisely, select the item "transfer through short range communication", and may transfer a document. On the other hand, in a case where the user desires to use the path for the TCP/IP communication, he/she selects the item "apply a path". According to the selection of this item, the control unit 24 activates the update processing unit 23. The update processing unit 23 acquires a patch for providing an upgrade to the latest version of the TCP/IP communication software, from the patch distribution server 2, according to an instruction from the control unit 24, and makes the version of the TCP/IP communication software the latest one by adding the patch to the TCP/IP communication software. When it is checked that the version is the latest, the display control unit 22 displays a screen that is illustrated in FIG. 5D. Then, the user may select the item "transfer through TCP/IP" and may transmit a document along the path for the TCP/IP communication.

It is noted that a screen that is illustrated in FIG. 5E, is displayed in a case where the transmitting side terminal 20 is in the state where the TCP/IP communication is available. In a case where the state where the TCP/IP communication is available is not entered, the display control unit 22 displays a screen that is illustrated in FIG. 5B. In this case, the user may cause the state where the TCP/IP communication is available, to be entered, and may cause a screen that is illustrated in FIG. 5E, to be displayed.

In the state S4 that is illustrated in FIG. 4, that is, in a case where both the TCP/IP communication software and the short range communication software are not in their latest-version states, the display control unit 22 displays a screen that is illustrated in FIG. 5F. More precisely, because the versions of both the pieces of communication software are not the latest, there is a likelihood that the security problem will occur on the paths for the TCP/IP communication and the short range communication. Because of this, the control unit 24 displays the items "transfer through TCP/IP" and "transfer in short range communication" in a grayed-out state in such a manner that the operation instruction cannot be received from the user, and causes the selection operation by the user not to be applied.

In this case, the user selects the item "apply a patch" to the communication software that he/she desires to use. As a result, as described above, the update processing unit 23 acquires a patch for providing an upgrade to the latest version of the selected communication software, from the patch distribution server 2, and makes the version of the selected communication software the latest one by adding the patch to the selected communication software. Accordingly, the display control unit 22 displays a screen that is illustrated in FIG. 5C or 5E according to the selected communication software. Subsequent processing operations are completely described above, and thus descriptions thereof are omitted.

As described above, the control unit 24 controls reception of the operation instruction from the user for the transferring processing according to a situation where the security problem will occur in the transmitting side terminal 20. Specifically, as described above, depending on whether or not the version of the communication software is the latest, the item is displayed in black to make the user operation applicable, or is displayed in a grayed-out state to make the user operation non-applicable.

Incidentally, in the case of the transfer through the TCP/IP, as described above, whatever a state of the receiving side terminal 40, a document is transferred up to the receiving side home server 50. In contrast to this, in the case of the short range communication, if the version of the short range communication in the receiving side terminal 40 is not the latest, the transmitting side terminal 20 cannot transfer a document. Accordingly, as illustrated in FIG. 5G, the display control unit 22 displays the item "make a request for patch application" in a selectable manner. When the user selects this item, the transmission processing unit 21 transmits a request for the patch application to the receiving side terminal 40 through the TCP/IP. When receiving this request, the display control unit 43 displays a screen that is illustrated in FIG. 6A, under the control of the control unit 45. In a case where the user wants to apply a patch, he/she selects a "YES" button. According to the selection of this button, the control unit 45 actives the update processing unit 44. The update processing unit 44 acquires the patch for providing the upgrade to the latest version of the short range communication software, from the patch distribution server 2, according to an instruction from the control unit 45, and makes the version of the short range communication the latest one by adding the patch to the short range communication software. When it is checked that the version is the latest, the display control unit 43 sets the screen that is illustrated in FIG. 6A, to be non-displayed, and the reception processing unit 41 receives a document along the communication path for the short range communication.

It is noted that when, regarding the patch application, the user selects a "NO" button from the screen that is illustrated in FIG. 6A, the receiving side terminal 40 does not receive a document.

Next, processing on the receiving side terminal 40 side will be described.

In the state S5 that is illustrated in FIG. 4, that is, in a case where both the TCP/IP communication software and the short range communication software are completely updated and are in their latest-version states, because the safeties of both the communication path for the TCP/IP and the path for the short range communication in the receiving side terminal 40 are guaranteed, the security problem does not occur. Because of this, although any communication path is selected, the receiving side terminal 40 is in a state where a document may be received. Therefore, for example, when the user selects the item "transfer short range communication" in the transmitting side terminal 20, the transmission processing unit 21 transmits a document to the receiving side terminal 40 using the short range communication. In response to this, the reception processing unit 41 receives the document along the communication path for short range communication and retains the received document in the document storage unit 46. On the other hand, when the user selects the item "transfer through TCP/IP" in the transmitting side terminal 20, the transmission processing unit 21 transmits a document to the receiving side terminal 40 along the communication path for the TCP/IP. In response to this, the reception processing unit 41 receives the document along the communication path for the TCP/IP and retains the received document in the document storage unit 46. It is noted that in this case, there is no need to perform the transferring processing and then to display a screen on the receiving side terminal 40. Of course, a message or the like indicating to the user that the document is received may be displayed.

In the state S6 that is illustrated in FIG. 4, that is, in a case where the version of the TCP/IP communication software is the latest and where, on the other hand, the short range communication software is not the latest, if the user on the transmitting side selects the item "transfer in short range communication", the display control unit 43 displays the screen that is illustrated in FIG. 6A. Subsequent processing operations are already described, and thus descriptions thereof are omitted here.

It is noted that in the state S6 that is illustrated in FIG. 4, in a case where the user on the transmitting side also selects the item "transfer through TCP/IP", the reception processing unit 41 may receive a document along the communication path for the TCP/IP, and the display control unit 43 does not need to display the screen that is illustrated in FIG. 6A.

In the state S7 that is illustrated in FIG. 4, that is, in case where the version of the short range communication software is the latest and where, on the other hand, the version of the TCP/IP communication software is not the latest, the display control unit 22 displays a screen that is illustrated in FIG. 6B.

Incidentally, as described above, when the user selects the item "transfer through TCP/IP" regardless of a state of the TCP/IP communication in the receiving side terminal 40, the transmission processing unit 21 transfers a document up to the receiving side home server 50. Therefore, as in an example of display of the screen that is illustrated in FIG. 6B, the user is notified that a document already arrives and that a patch needs to be applied in order to receive the document. At this point, in a case where the user wants to apply the patch, he/she selects a "YES" button. According to the selection of this button, the control unit 45 activates the update processing unit 44. The update processing unit 44 acquires the patch for providing the upgrade to the latest version of the TCP/IP communication software, from the patch distribution server 2, according to an instruction from the control unit 45, and makes the version of the TCP/IP communication software the latest one by adding the patch to the TCP/IP communication software. When it is checked that the version is the latest, the display control unit 43 sets the screen that is illustrated in FIG. 6B, to be non-displayed, and the reception processing unit 41 receives a document from the receiving side home server 50.

It is noted that when, regarding the patch application, the user selects the "NO" button from the screen that is illustrated in FIG. 6B, the receiving side terminal 40 does not receive a document.

In the state S8 that is illustrated in FIG. 4, that is, in the case where both the TCP/IP communication software and the short range communication software are not in their latest-version states, the display control unit 43 may display a screen that is illustrated in FIG. 6A or 6B according to the item selected in the transmitting side terminal 20. Any case is already described, and thus the description thereof is omitted.

As described above, the receiving side terminal 40 receives a document that is a target for reading, from the transmitting side terminal 20.

It is noted that in the transferring processing described above, each of the terminals 20 and 40 is set to receive a result of investigation from the terminal management server 14 and to control performing of the transferring processing of a document, but that the terminal management server 14 may be set to control performing of the transferring processing, such as display control of a screen, in cooperation with the control units 24 and 45, based on contents of the result of the investigation.

Subsequent, the reading processing is described with reference to FIG. 7 that is a sequence diagram. It is noted that in the reading processing, it is assumed that a receiving side terminal for performing the reading processing of a document is referred to as "reading terminal".

First, the user (here, the user B) who desires to read a document in order to provide an approval performs a prescribed reading operation, such as designation of a document that is a target for reading, among documents that are retained in the document storage unit 46. The terminal device that is used by the user B for reading the document, that is, the reading terminal 40 may be any one of the mobile terminal 11*b* and the PC 12*b*.

The reading processing unit 42 in the reading terminal 40 transmits a reading request that includes a terminal ID of the reading terminal 40, to the receiving side home server 50 according to the user operation (Step 201).

When the receiving side home server 50 receives the reading request, the reading processing countermeasure unit 53 transmits a request for investigation request in the reading processing, which includes the terminal ID of the reading terminal 40, to the terminal management server 14 (Step 211).

When receiving the request for investigation from the receiving side home server 50, referring to the terminal information, the terminal management unit 141 in the terminal management server 14 investigates a type of terminal indicating whether the reading terminal 40 is an MDM terminal or a non-MDM terminal, and a situation of application of a patch to a reading software (Step 221). Then, a result of the investigation is transmitted to the reading terminal 40 (Step 222).

The result of the investigation for the reading processing by the terminal management server 14 is described here with reference to a table that is illustrated in FIG. 8.

As described above, it is investigated whether the reading terminal 40 is the mobile terminal 11*b* that is the MDM terminal or the PC 12*b* that is the non-MDM terminal and whether or not the reading software is completely updated. In FIG. 8, combinations of terminal types of the reading terminals 40 and states of an update of the reading software are illustrated as states S9 and S12.

Subsequently, processing that is performed in the reading terminal 40 after the terminal management server 14 replies with a result of the investigation is described with reference to FIGS. 9A and 9B.

FIGS. 9A and 9B are diagrams each illustrating an example of the screen display that is the display candidate when the reading processing is performed in the reading terminal 40. The display control unit 43 displays any screen, as necessary, under the control of the control unit 45.

First, in the state S9 that is illustrated in FIG. 8, that is, in a case where the reading terminal 40 is the MDM terminal and where the reading software is completely updated and is in its latest version state, the display control unit 43 screen-displays a document designated by the user without displaying a screen that is illustrated in FIGS. 9A and 9B. Accordingly, it is possible that the user reads the document.

In the state S10 that is illustrated in FIG. 8, that is, in a case where the reading terminal 40 is the MDM terminal and where the reading software is not completely updated and because of this, is not in its latest version state, there is a likelihood that the security problem will occur. For example, the version of the reading software is not the latest, and thus there is a likelihood that screen capture which functions in the reading terminal 40 will not be detected. When a document is read in this state, there is a likelihood that information which is contained in the document will leak out. In order to prevent this problem in advance, the display control unit 43 displays a screen that is illustrated in FIG. 9A. In the case where the user wants to apply a patch, he/she selects the "YES" button. According to the selection of this button, the control unit 45 actives the update processing unit 44. The update processing unit 44 acquires the patch for providing the upgrade to the latest version of the reading software, from the patch distribution server 2, according to an instruction from the control unit 45, and makes the version of the reading software the latest one by adding the patch to the reading software. When it is checked that the version is the latest, the display control unit 43 displays the screen that is illustrated in FIG. 9A and displays a document on the screen. Accordingly, it is possible that the user reads the document.

In the states S11 and S12 that is illustrated in FIG. 4, that is, in a case where the reading terminal 40 is the non-MDM terminal, the display control unit 43 displays a screen that is illustrated in FIG. 9B. That is, by displaying a document on the non-MDM terminal, it is determined that the security problem will occur and it is urged that the document is read on the MDM terminal.

Figure 10:
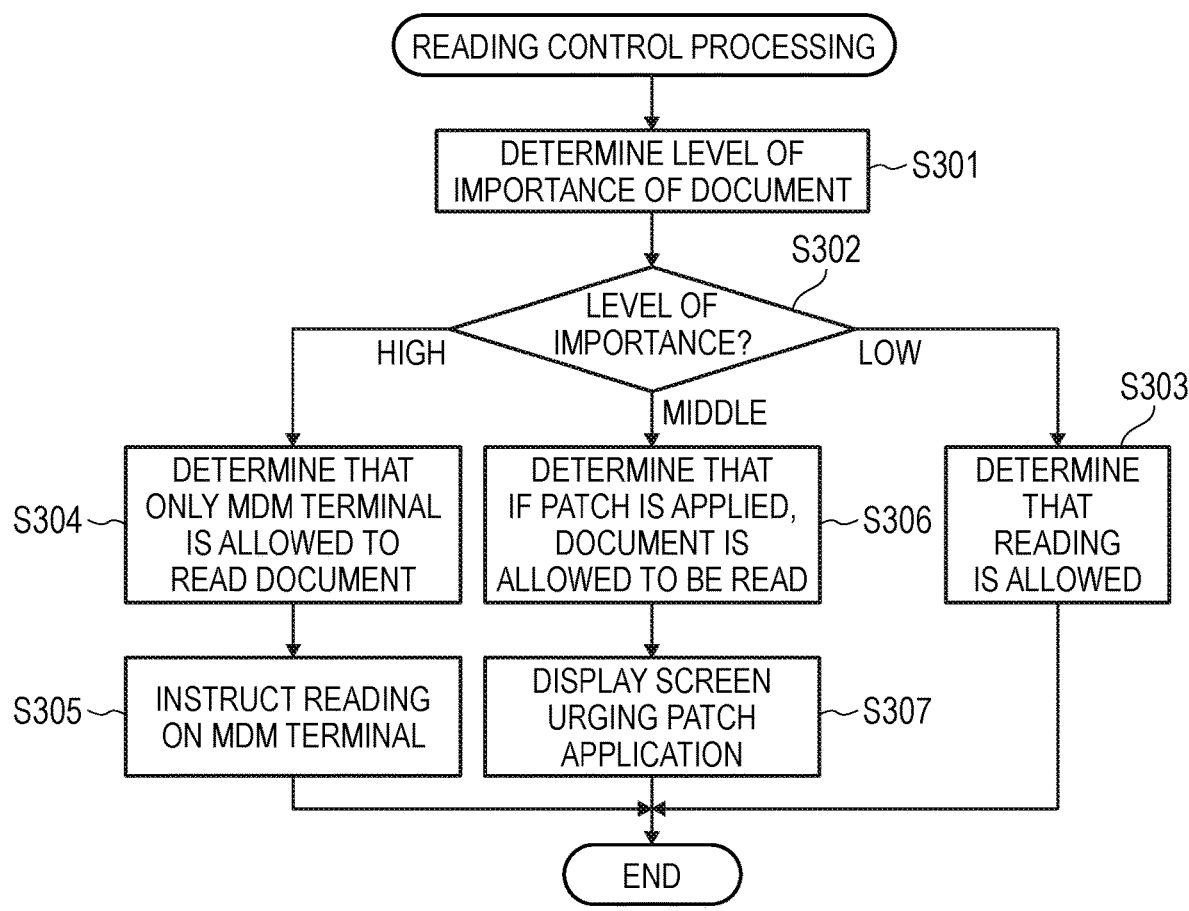
FIG. 10 is a flowchart illustrating reading control processing according to the present embodiment.

Incidentally, among documents that are targets for reading, there are also documents that are not subject to strict confidentiality. In the case of the document that is not subject to strict confidentiality, although the document is displayed on the non-MDM terminal, it is considered that the security problem will not occur. Accordingly, in the exemplary embodiment, according to a relationship between the reading terminal 40 and an importance level of a document, it is controlled whether or not the reading is approved. At this point, in a case where a document is set to be read on the non-MDM terminal, according to the importance level of the document, it is determined whether or not the reading is approved. Reading control processing that is based on the importance level of the document is described with reference to FIG. 10 that is a flowchart.

The reading processing unit 42 determines the importance level by checking the access right that is set for the document that is the target for reading (Step 301). It is noted that information relating to the access right is managed in the user management server 15. For example, if the access right is set that allows anyone to refer to a document (low in Step 302), it is determined that the confidentiality of the document is relatively low (more precisely, the document of which the importance level is low) and thus it is determined that the reading is also allowed on the non-MDM terminal (Step 303). That is, the display control unit 43 displays the document on a screen. Accordingly, it is possible that the user reads the document.

Furthermore, if the access right is set that allows only a user holding a prescribed or higher-ranking employment position, such as a manager, in an office, to have access to a document (high in Step 302), it is determined that the confidentiality of the document is relatively high (more precisely, the document of which the importance level is high), and thus the reading processing unit 42 determines that only the MDM terminal is allowed to read the document (Step 304). Accordingly, the display control unit 43 displays a screen that is illustrated in FIG. 9B, in such a manner that the document is read on the MDM terminal (Step 305).

On the other hand, in the case of other documents, that is, in the case of a document of which the importance level is middle (middle in Step 302), the reading processing unit 42 determines that if a patch is applied to the reading software, the document is allowed to be read (Step 306). Accordingly, the display control unit 43 displays the screen that is illustrated in FIG. 9A (Step 307). It is noted that in the state S11 that is illustrated in FIG. 8, that is, in a case where the version of the reading software is already the latest, the display control unit 43 displays the screen that is illustrated in FIG. 9A and displays a document on the screen. Accordingly, it is possible that the user reads the document.

As described above, the user B checks contents in such a manner that a document may be made to be read. Then, the user B notifies the user A of approval or non-approval using a prescribed method.

It is noted that in a case where the reading terminal 40 is the MDM terminal, even if the version of the reading software is not the latest, for example, in the case of a document of which the importance level is low, referring to the importance level of the document, the document may be set in such a manner that the document may be read.

Furthermore, in the exemplary embodiment, three levels of importance are set, but no limitation to this example is imposed, and two or more levels of importance may be set. In the exemplary embodiment, the determination of the importance level is made referring to an attribute such as the access right that is set for a document from the perspective of the security, but the determination of the importance level may be made with any other attribute or a combination with any other attribute.

It is noted that in the reading processing described above, the reading terminal 40 is set to receive a result of the investigation from the terminal management server 14 and to perform reading control of a document, but that the terminal management server 14 may be set to control performing of the reading processing, such as display control of the document in the reading terminal 40, in cooperation with the control unit 45, based on contents of the result of the investigation. Furthermore, the reading terminal 40 transmits a reading request including identification information on a document (hereinafter referred to "document ID"), and the terminal management server 14 may be set to perform the reading control that is based on the importance level of the document.

In the exemplary embodiment, when the transferring processing and the reading processing that are included in the approving processing are performed as described above, if there is a likelihood that the security problem will occur in the transferring processing that is performed in advance, the transferring processing may be performed regardless of whether or not there is a likelihood that the security problem will occur in the reading processing. For example, although it is understood that the reading processing cannot be performed because the receiving side terminal 40 is the non-MDM terminal, regarding the transferring processing in which it does not manner whether the receiving side terminal 40 is the MDM terminal or the non-MDM terminal, it is possible that, although the receiving side terminal 40 is the non-MDM terminal, the processing proceeds. In this manner, in the exemplary embodiment, processing up to and including sub-processing in which the security problem does not occur may be performed in a time-series manner.

The transferring processing and the reading processing that are equivalent to sub-processing of the approving processing that is used for the above description have a time-series relationship. That is, in the relationship, the transferring processing is normally ended and the reading processing may be performed for the first time. If there is no time-series relationship between sub-processing operations, the sub-processing in which the security problem does not occur may be performed in advance. When this is done, because the security problem occurs in one or several sub-processing operations, in a case where processing (which is equivalent to the approving processing according to the exemplary embodiment) is not performed, the security problem in the one or several sub-processing operations is resolved and then all processing is started to be performed. However, if sub-processing in which the security problem does not occur is performed in advance, as a result, it is possible that all processing is ended quickly. In this manner, according to the exemplary embodiment, because performing of each sub-processing operation is controlled according to a situation where the security problem in sub-processing occurs, it is possible that the processing is performed efficiently.

Moreover, according to the exemplary embodiment, in the transferring processing, in a case where multiple communication paths are prepared, the user may select a communication path on which there is no likelihood that the security problem will occur, and may transfer a document. If the document is desired to be transferred along the communication path on which there is a likelihood that the security problem will occur, this problem is resolved. Specifically, in a case where inquiry is made of the user regarding whether or not to apply a patch and where the user selects the patch application, the patch is actually applied according to the selection, and thus the problem is resolved.

It is noted that in the exemplary embodiment, as an example, the case is described where the processing (the approving processing in the example described above) including the sub-processing operations (the transferring processing and the reading processing in the example described above) is performed in the terminal device of the user A and the terminal device of the user B. More precisely, the processing that is performed by multiple terminal devices in a cooperative manner is taken as an example, but it is possible that the processing including multiple sub-processing operations also finds application in a case where the processing is performed in one terminal device.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing control system comprising:
   at least one terminal device that is used by at least one user;
   a monitoring unit that monitors a security status of the at least one terminal device; and
   a control unit that controls, in a case where the security status which relates to executing processing instructed from the at least one user does not meet a condition, the processing including a plurality of sub-processing operations on the at least one terminal device, execution of each of the sub-processing operations on the at least one terminal device based on the security status of the at least one terminal device, wherein
   the at least one terminal device includes a first terminal device used by a first user and a second terminal device used by a second user,
   the processing includes first sub-processing and second sub-processing, the second sub-processing becomes executable after the first sub-processing is normally executed,
   the first sub-processing is transmitting processing of a document from the first terminal device to the second terminal device,
   a security status relating to executing the first sub-processing relates to software installed in the first terminal device, and the security status relating to executing the first sub-processing that relates to the software installed in the first terminal device meets the condition when a version of the software installed in the first terminal device is a latest version,
   the second sub-processing is receiving processing of the document at the second terminal device from the first terminal device,
   a security status relating to executing the second sub-processing relates to software installed in the second terminal device, and the security status relating to executing the second sub-processing that relates to the software installed in the second terminal device meets the condition when a version of the software installed in the second terminal device is a latest version, and
   in a case where the security status relating to executing the second sub-processing that relates to the software installed in the second terminal device does not meet the condition, and in a case where the security status relating to executing the first sub-processing that relates to the software installed in the first terminal device meets the condition, the control unit controls the at least one terminal device such that an operation instruction for the first sub-processing is received on the first terminal device from the first user.

2. The processing control system according to claim 1, wherein the control unit controls reception of an operation instruction from the at least one user for the sub-processing operations based on the security status of the at least one terminal device.

3. The processing control system according to claim 2, wherein, in a case where the security status meets the condition, the control unit controls the at least one terminal device such that the operation instruction for the sub-processing operations is received on the at least one terminal device from the at least one user.

4. The processing control system according to claim 2, wherein, in a case where the security status which relates to executing the sub-processing operations does not meet the condition, the control unit controls the at least one terminal device such that the operation instruction for the sub-processing operations is not received on the at least one terminal device from the at least one user.

5. The processing control system according to claim 4, further comprising:

an inquiry unit that makes an inquiry to the at least one user about whether the security status on the at least one terminal device in executing the sub-processing operations is to be updated; and an update unit that updates the security status in a case where the at least one user makes a request for updating the security status in responding to the inquiry by the inquiry unit;

wherein the control unit controls the at least one terminal device such that the operation instruction for the sub-processing operations is received from the at least one user on the at least one terminal device in which the security status is updated.

6. The processing control system according to claim 1, the processing includes third sub-processing, the third sub-processing becomes executable after the second sub-processing is normally executed, and the third sub-processing is displaying the document transmitted to the second terminal device on the second terminal device in such a manner that the second user reads the document displayed.

7. The processing control system according to claim 6, wherein, in a case where there are a plurality of candidate paths for transferring the document in the transferring processing, and in case of where executing the transferring processing using at least one of the plurality of candidate paths does not meet the condition, the control unit controls the first terminal device such that an operation instruction for the transferring processing using the at least one of the plurality of candidate paths is not received from the first user.

8. The processing control system according to claim 6, wherein the control unit controls whether or not the displaying processing of the document on the second terminal device is allowed based on a security status of the second terminal device and an importance level of the document.

9. A terminal device management server comprising:

a monitoring unit that monitors a security status of at least one terminal device used by at least one user; and a control unit that controls, in a case where the security status which relates to executing processing instructed from the at least one user does not meet a condition, the processing including a plurality of sub-processing operations on the at least one terminal device, execution of each of the sub-processing operations on the at least one terminal device based on the security status of the at least one terminal device, wherein the at least one terminal device includes a first terminal device used by a first user and a second terminal device used by a second user, the processing includes first sub-processing and second sub-processing, the second sub-processing becomes executable after the first sub-processing is normally executed, the first sub-processing is transmitting processing of a document from the first terminal device to the second terminal device, a security status relating to executing the first sub-processing relates to software installed in the first terminal device, and the security status relating to executing the first sub-processing that relates to the software installed in the first terminal device meets the condition when a version of the software installed in the first terminal device is a latest version, the second sub-processing is receiving processing of the document at the second terminal device from the first terminal device, a security status relating to executing the second sub-processing relates to software installed in the second terminal device, and the security status relating to executing the second sub-processing that relates to the software installed in the second terminal device meets the condition when a version of the software installed in the second terminal device is a latest version, and in a case where the security status relating to executing the second sub-processing that relates to the software installed in the second terminal device does not meet the condition, and in a case where the security status which relates to executing the first sub-processing that relates to the software installed in the first terminal device meets the condition, the control unit controls the at least one terminal device such that an operation instruction for the first sub-processing is received on the first terminal device from the first user.

10. A non-transitory computer readable medium storing a program causing a computer to execute a process for managing a terminal device, the process comprising:

monitoring a security status of at least one terminal device used by at least one user;

controlling, in a case where the security status which relates to executing processing instructed from the at least one user does not meet a condition, the processing including a plurality of sub-processing operations on the at least one terminal device, execution of each of the sub-processing operations on the at least one terminal device based on the security status of the at least one terminal device, wherein the at least one terminal device includes a first terminal device used by a first user and a second terminal device used by a second user, the processing includes first sub-processing and second sub-processing, the second sub-processing becomes executable after the first sub-processing is normally executed, the first sub-processing comprises transmitting processing of a document from the first terminal device to the second terminal device, a security status relating to executing the first sub-processing relates to software installed in the first terminal device, and the security status relating to executing the first sub-processing that relates to the software installed in the first terminal device meets the condition when a version of the software installed in the first terminal device is a latest version, the second sub-processing comprises receiving processing of the document at the second terminal device from the first terminal device, a security status relating to executing the second sub-processing relates to software installed in the second terminal device, and the security status relating to executing the second sub-processing that relates to the software installed in the second terminal device meets the condition when a version of the software installed in the second terminal device is a latest version, and in a case where the security status relating to executing the second sub-processing that relates to the software installed in the second terminal device does not meet the condition, and in a case where the security status relating to executing the first sub-processing that relates to the software installed in the first terminal device meets the condition, controlling the at least one terminal device such that an operation instruction for the first sub-processing is received on the first terminal device from the first user.

* * * * *